April 29, 1952 H. B. MADDER 2,594,950
HOIST SWIVEL
Filed July 14, 1949

INVENTOR.
Harold B. Madder
BY

Patented Apr. 29, 1952

2,594,950

UNITED STATES PATENT OFFICE 2,594,950

HOIST SWIVEL

Harold B. Madder, Houston, Tex., assignor to
O. W. Sanders, Houston, Tex.

Application July 14, 1949, Serial No. 104,657

1 Claim. (Cl. 59—95)

This invention relates to a new and useful improvement in a hoist swivel.

An object of the invention is to provide a swivel for use on chain hoists and the like having a novel means for securing the chain to the swivel.

In the present type of chain hoist swivels, where the chain breaks, considerable time is lost disconnecting the eye commonly used for securing said chain, and removing the broken piece and securing the eye to the chain and replacing it on the swivel. An object of this invention is to provide a fastening means on the swivel that will permit rapid removal of the securing pin, freeing the broken piece of chain and securing the top link of the unbroken chain to the swivel.

Another object of the invention is to provide a novel locking means for retaining the chain holding pin in position in the swivel.

The above and other objects will be apparent from the following description and illustrated in the accompanying drawings, wherein.

Figure 1:
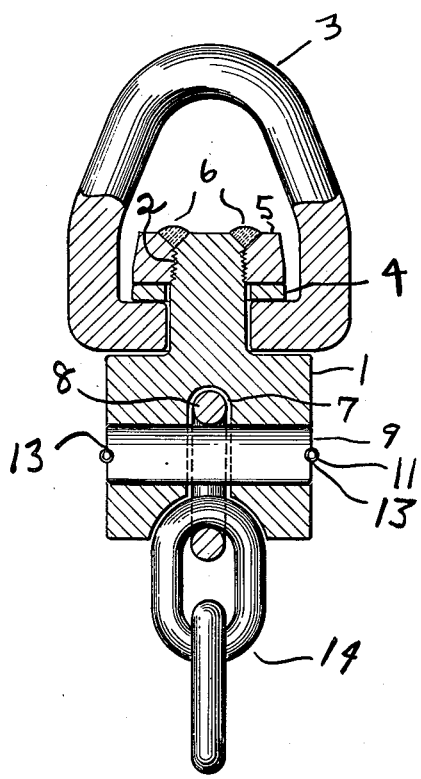
Figure 1 is a front elevational view of the invention, partly in section.
Figure 2:
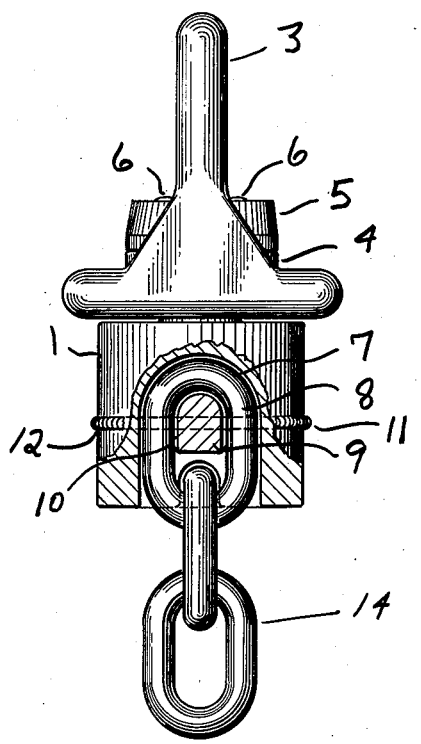
Figure 2 is a side elevation of the invention, partly in section.

Referring now more particularly to the drawings the numeral 1 designates the swivel block, the upper end of which is reduced and threaded as at 2. The swivel link 3 embraces the reduced portion of the block and an annular bushing 4 is loosely mounted on said reduced portion. A cap 5 having suitable inside threads, is screwed onto the threaded portion 2 of the swivel block. This cap may be welded in position as shown by the welds 6, 6.

A chain link receiving chamber 7 is formed in the lower end of the swivel block 1 which is shaped to snugly receive a link 8 of the chain 14. Said chamber 7 is enlarged at its lower end to permit the connecting link 8 to fit well up into the chamber 7. A retaining pin as 9 fits snugly in the transverse chamber 10 which bisects the swivel block 1 and the chamber 7. A retaining ring 11, such as a snap ring, is adapted to fit in a peripheral groove 12 around said swivel block and in the end grooves 13, 13 in said retaining pin 9 to maintain said pin in position.

When the chain hoist is in use and the chain 14 breaks, the snap ring 11 is moved out of the grooves 12, 13 and up on the swivel block, permitting the pin 9 to be removed, releasing the link 8 and the broken portion of the chain discarded and the first link in the unbroken portion of the chain quickly inserted into the chamber 7 and the retaining pin mounted in the chamber 10 and the snap ring 11 moved back into position in the grooves 12, 13 and work is resumed.

The embodiments of the invention herein shown and described are to be regarded as illustrative only and it is to be understood that the invention is susceptible to variation, modification and change within the scope of the appended claim.

What I claim is:

In a chain hoist swivel, a swivel block, the upper end of said block being reduced into cylindrical form and having outside threads on the free end thereof, a cap threaded onto said threaded end and being welded in position, a hoist link embracing said cylindrical portion of said block, a bushing mounted on said cylindrical portion of said block between said hoist link and cap, there being a chain link receiving chamber in said block, said block having a transverse retaining pin chamber bisecting said block and intersecting said link chamber, a retaining pin mounted in said pin chamber and adapted to pass through a chain link, a snap ring mounted on the periphery of said block maintaining said retaining pin in retaining position.

HAROLD B. MADDER.

REFERENCES CITED

The following references are of record in the file of this patent:

UNITED STATES PATENTS

| Number | Name | Date |
|---|---|---|
| 721,801 | Hooker | Mar. 3, 1903 |
| 1,021,271 | Sharp | Mar. 26, 1912 |
| 1,831,765 | Gouverneur | Nov. 10, 1931 |
| 2,152,298 | Winninger | Mar. 28, 1939 |
| 2,400,291 | D'Aleo | May 14, 1946 |
| 2,435,328 | Smith | Feb. 3 1948 |